W. V. TURNER.
FLUID PRESSURE BRAKE.
APPLICATION FILED MAR. 31, 1911.
1,159,434.
Patented Nov. 9, 1915.
5 SHEETS—SHEET 3.
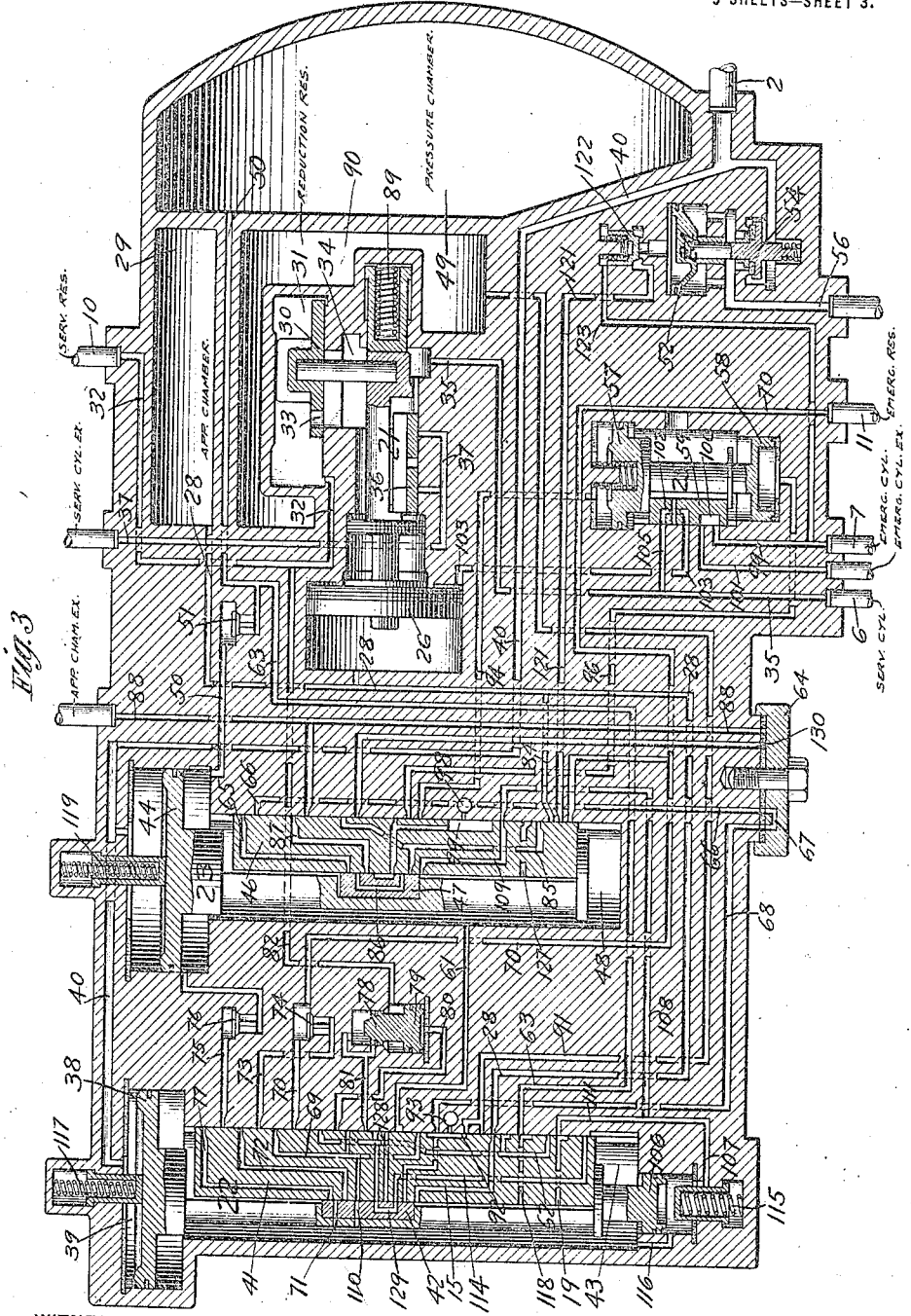

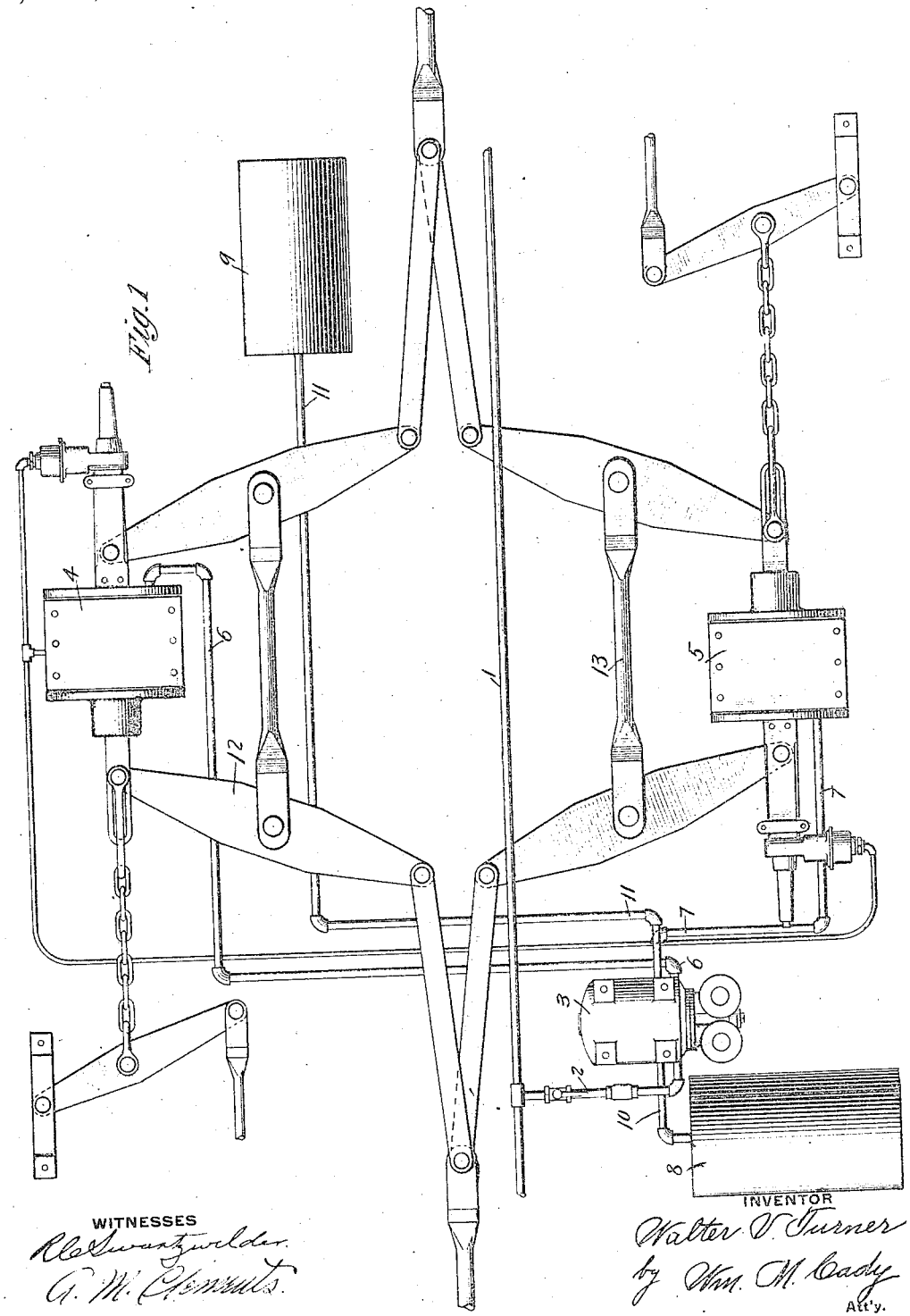

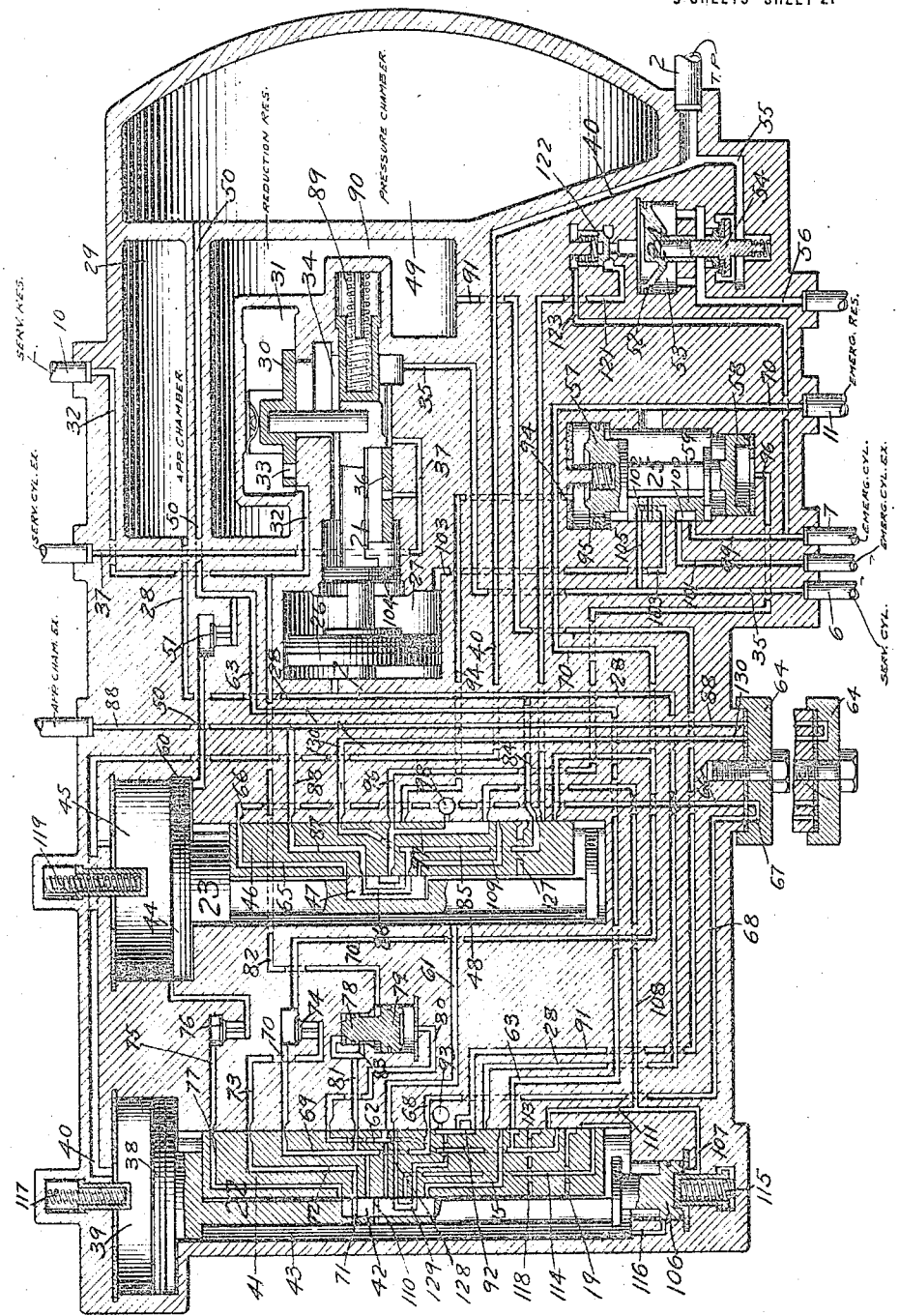

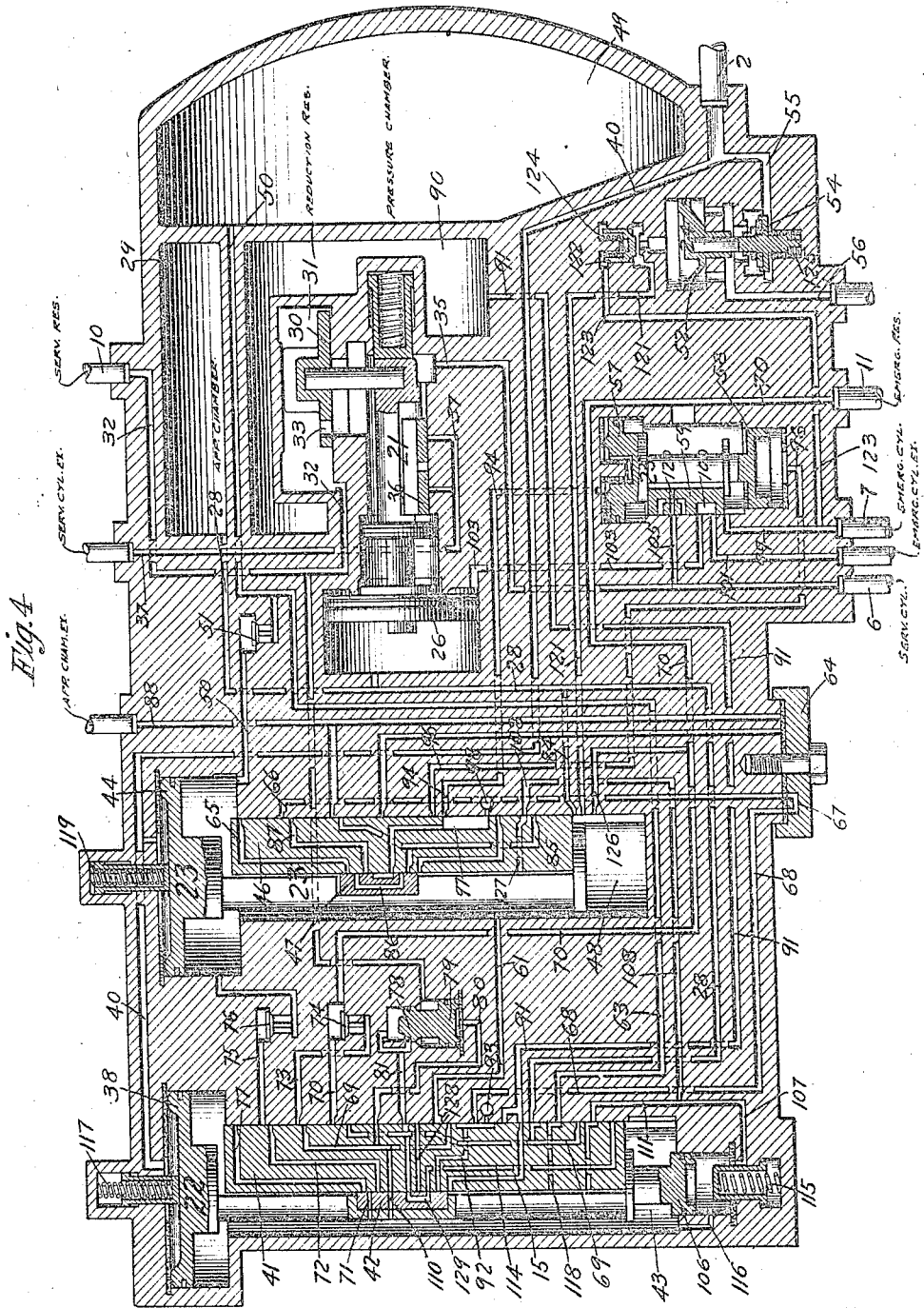

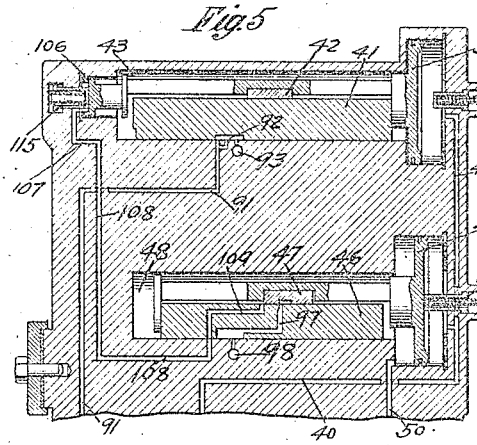
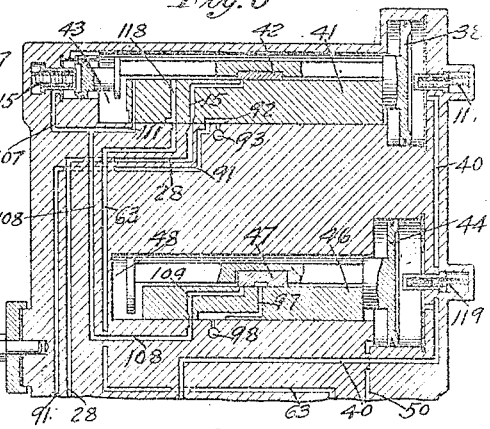
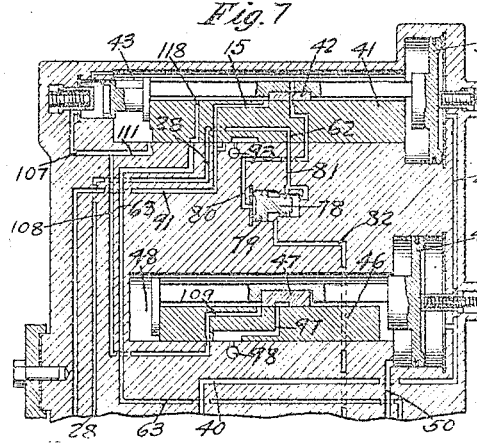
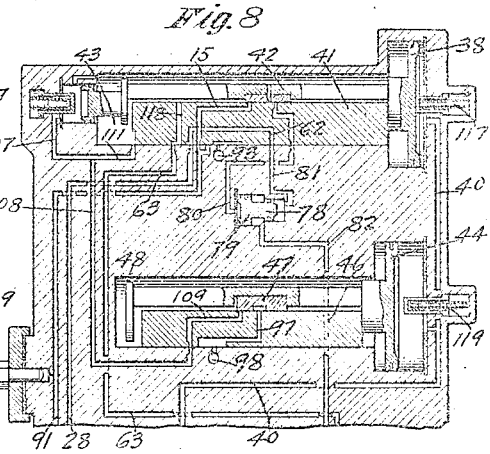
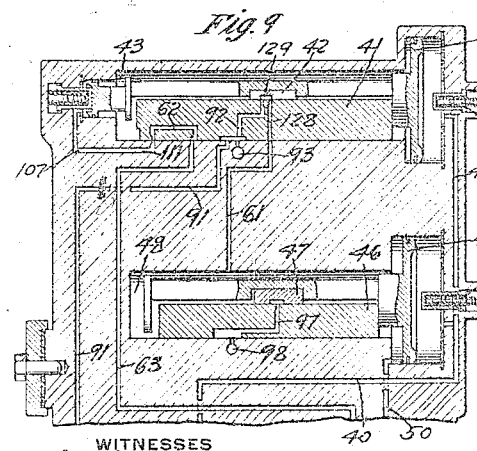
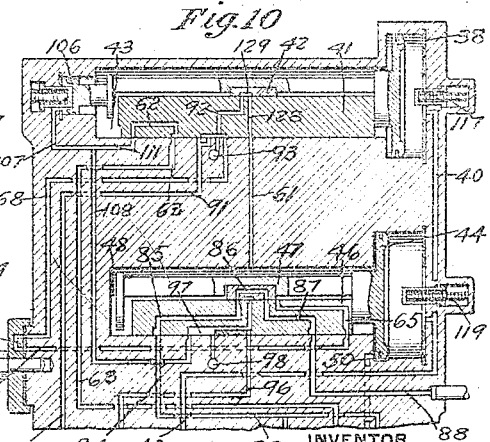

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,159,434.  Specification of Letters Patent.  Patented Nov. 9, 1915.

Application filed March 31, 1911. Serial No. 618,218.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and is more particularly in the nature of an improvement on the control valve devices, such as form the subject matter of my prior pending applications, Serial No. 549,229, filed March 14, 1910 and Serial No. 605,387, filed January 30, 1911.

An equipment of the above character is more particularly adapted to be employed in connection with long and heavy trains running at high rates of speed.

In control valve devices as well as in triple valve devices, upon increasing the train pipe pressure to release the brakes after the same have been applied, the movement of the equalizing piston to release position opens up communication for replenishing the storage reservoirs with fluid under pressure to compensate for the fluid used in applying the brakes.

By reason of the more rapid increase in train pipe pressure at the head end of the train, the equalizing pistons at the head end move to release position first and open communication for recharging the depleted reservoir volumes, and if large volumes are to be recharged, it may happen that fluid will be taken from the train pipe at such a rate as to interfere with the prompt release of the brakes, by reason of the consequent slow rise in train pipe pressure, particularly on a long train.

One object of my invention is therefore to provide means adapted to insure the prompt release of the brakes after an application thereof.

Another object of my invention is to provide means for preventing the movement of the equalizing valve device to effect an application of the brakes under light fluctuations in train pipe pressure, such as might be caused by leakage from the train pipe or by variable action of the train pipe feed valve device in supplying fluid to the train pipe.

With the increased number and size of ports and cavities controlled by the equalizing valve mechanism, it may require such a differential of pressures between the pressure chamber and the train pipe to start the same that the equalizing piston, having once started to move, will move out past the usual service application position to the second service position provided in this type of valve device.

Another object of my invention is to provide an improved control valve mechanism adapted to obviate the above difficulty.

Another object of my invention is to provide means for insuring the prompt and positive release of the brakes upon a light increase in train pipe pressure.

There are a number of reservoirs employed in connection with the control valve device, such as the service reservoir, the emergency reservoir, and the pressure chamber, and in the release position of the parts, all of these reservoirs are in communication, in the former designs, and consequently, in case of a drop in pressure in one of the reservoirs, due to leakage or otherwise, it might be necessary to reduce the train pipe pressure to a degree less than would otherwise be required in order to secure a sufficient differential of pressures to effect an application of the brakes.

Another object of my invention is to obviate the possibility of such an occurrence as indicated above and for this purpose means are provided for preventing a reduction in pressure in one of the reservoirs from reducing the pressure in the pressure chamber.

Another object of my invention is to provide a brake control mechanism which is sensitive to a lighter variation in train pipe pressure to effect a release of the brakes than is required to effect an application of the brakes.

Another object is to compensate for increase in volume due to the displacement of the equalizing piston in moving out to effect an application of the brakes.

Another object is to provide an improved means for cutting the graduated release into and out of action.

Another object is to provide an improved brake control mechanism having a valve device for effecting an application of the brakes and a separate valve device for effecting the release of the brakes.

Other objects and advantages will be referred to in the following more detailed description of the invention.

In the accompanying drawings, Figure 1 is a plan view of a car brake equipment with my improvement applied thereto; Fig. 2 a diagrammatic central sectional view of the improved control valve mechanism, showing the parts in normal full release position; Fig. 3 a similar view, showing the parts in service application position; Fig. 4 a similar view, showing the parts in emergency application position; Fig. 5 a similar view of the equalizing and release portion of the control valve mechanism, showing the parts in preliminary service application position, omitting all ports and passages except those actually in use in this position; Fig. 6 a similar view, showing the parts in service lap position; Fig. 7 a similar view, showing the parts in over reduction service application position; Fig. 8 a similar view showing the parts in over reduction service lap position; Fig. 9 a similar view, showing the parts in preliminary release position; and Fig. 10 a similar view, showing the parts in secondary release position.

My invention may be applied to a car air brake equipment such as shown in Fig. 1 of the drawings, comprising a train pipe 1, connected by branch pipe 2 to the improved brake control valve mechanism 3, service brake cylinder 4, and emergency brake cylinder 5 connected by the respective pipes 6 and 7 to the valve mechanism 3, service reservoir 8, and emergency reservoir 9, connected by the respective pipes 10 and 11 to said valve mechanism 3. The service brake cylinder 4 is adapted to operate the brakes through a brake lever system 12 and the emergency brake cylinder 5 through a brake lever system 13, the pistons of the respective brake cylinders being adapted to move in opposite directions in applying the brakes.

At the outset, it may be stated that while the invention will be described in connection with an application valve device having an application chamber, variations in pressure in which are adapted to operate the application valve device for effecting the admission and release of fluid to and from the brake cylinder, the equalizing and the release valve devices may be employed to supply and release fluid directly to and from a brake cylinder. It will also be understood that my improvements may be employed in connection with a single brake cylinder instead of two.

The improved control valve mechanism, as shown diagrammatically in section in Figs. 2 to 10 inclusive, may comprise a casing containing an application valve device 21, an equalizing valve device 22, a release valve device 23, a quick action valve mechanism 24, and an emergency valve mechanism 25. The application valve device 21 comprises a movable abutment 26 contained in piston chamber 27 and having the chamber at its outer face in communication through a passage 28 with application chamber 29, and a slide valve 30 contained in valve chamber 31, communicating through passage 32 and pipe 10 with the service reservoir 8, and having a port 33 for supplying air from valve chamber 31 to valve chamber 34, which is connected by passage 35 with the service brake cylinder pipe 6. The movable abutment 26 operates valve 30 and also a brake cylinder release valve 36 which is contained in valve chamber 34 and is adapted to control communication from valve chamber 34 to exhaust passage 37. The equalizing valve device 22 comprises a piston 38 contained in piston chamber 39 communicating through passage 40 with train pipe branch pipe 2, and piston 38 is adapted to operate a main slide valve 41 and an auxiliary valve 42 mounted on the main valve and having a movement relative thereto, said valves being contained in valve chamber 43. The release valve device 23 comprises a piston 44 contained in piston chamber 45 communicating with the train pipe through passage 40, and a main valve 46 and auxiliary valve 47 contained in valve chamber 48 and adapted to be operated by the piston 44, said valve chamber 48 being connected to the pressure chamber 49 through a passage 50 containing a check valve 51 adapted to permit flow of air only from the pressure chamber to the valve chamber. The quick action valve mechanism 24 comprises a movable abutment 52 contained in chamber 53 and a valve 54 adapted to be operated by said abutment for venting air from the train pipe in an emergency application of the brakes through a passage 55 to an exhaust passage 56. The emergency valve mechanism 25 comprises a differential piston having a large piston head 57 and a small piston head 58 for operating a slide valve 59.

Upon supplying fluid under pressure to the train pipe, air flows through passage 40 to the pistons 38 and 44. Assuming that both pistons are in full release position, as shown in Fig. 2, a feed groove 60 around piston 44 permits fluid to flow from the train pipe passage 40 into the valve chamber 48, and thence through a passage 61, leading from said valve chamber to the seat of slide valve 41, to a port 62 in said slide valve, which port has a port opening registering in full release position with passage 63 which in turn opens into passage 50 leading to the pressure chamber, so that the pressure chamber 49 becomes charged with fluid under pressure. As communication through passage 50 in the direction from the valve chamber 48 to the pressure chamber 49 is closed by check valve 51, it is evident that the pressure chamber 49 can only be charged through the port 62 when the parts are in the normal full release position. If cap 64, the purpose of which will be described further on, is adjusted to the position shown in Fig. 2, then fluid may also flow from the valve chamber 48 through port 65 in slide valve 46, to passage 66 and thence through the U shaped cavity 67 in cap 64 to passage 68, which registers with a port opening of a port 69 in slide valve 41. Port 69 has another port opening which registers with passage 70 leading to emergency reservoir pipe 11, so that the emergency reservoir is also charged in this position with fluid under pressure. If the cap 64 is in its position for cutting out graduated release, the passage 66 is cut off from passage 68 and the emergency reservoir is charged from valve chamber 43 through port 71 in the auxiliary valve 42, port 72 in the main valve 41 and passage 73 which communicates with passage 70 around a check valve 74. In full release position, a passage 75 containing check valve 76 and opening to the train pipe side of piston 44 when said piston is in full release position registers with port 77 in slide valve 41, so that the valve chamber 43 is charged from the train pipe in this position.

According to my present invention, the service reservoir is charged only from the emergency reservoir and only after the pressure in the pressure chamber has reached a certain degree of pressure less than the pressure in the emergency reservoir. For this purpose, a differential piston is provided having a small piston head 78 subject to emergency reservoir pressure and a large piston head 79 subject to the pressure in the pressure chamber 49. The chamber adjacent the large head 79 is connected by passage 80 to a port opening of port 62, so that the same is subject to the pressure of fluid supplied to the pressure chamber 49 through the port 61, while the chamber adjacent the small piston head 78 is connected by passage 81 to a port opening of port 69, so that said head is subject to emergency reservoir pressure supplied through passage 70.

In charging up, if the pressure of fluid flowing to the pressure chamber 49 equals or exceeds a predetermined ratio with respect to the emergency reservoir pressure, as determined by the relative sizes of the piston heads 78 and 79, then the differential piston will be shifted to the position shown in Fig. 2 in which a passage 82 leading from service reservoir passage 32 to the space between the piston heads 78 and 79 is adapted to communicate with a branch passage 83 leading from said space to passage 81. Fluid is thus supplied from the emergency reservoir to the service reservoir. If the pressure in the pressure chamber is less than the pressure in the emergency reservoir by the predetermined amount, then the emergency reservoir pressure will maintain the differential piston in its opposite position, in which communication from the emergency reservoir to the service reservoir is cut off.

Ordinarily, in charging up the system it will be evident that all of the reservoirs charge up at the same time, but if a service application of the brakes has been made and the pressure in the service reservoir is thus reduced, then upon increasing the train pipe pressure to effect the release of the brakes, the differential piston will be maintained by the emergency reservoir pressure in the position for cutting off the service reservoir charging port, until the pressure in the pressure chamber has been increased to a point somewhat less than the emergency reservoir pressure, according to the relative sizes of the piston heads of the differential piston, say for example, 5 to 8 pounds less, then the differential piston is shifted to open the communication for recharging the service reservoir. By thus preventing the charging of the service reservoir until the pressure in the pressure chamber has increased to nearly the normal pressure carried, it will be evident that the prompt movement of the equalizing and release pistons throughout the train is greatly facilitated, as reduction in train pipe pressure by flow to the service reservoirs is prevented and consequently a sufficient increase in train pipe pressure is always assured for the purpose of shifting said pistons to release position.

In the full release position of the release valve device, a passage 84, leading from the application chamber passage 28 to the seat of the slide valve 46, is connected to a port opening of port 85 in the valve 46 and port 85 communicates through cavity 86 in the auxiliary valve 47 and port 87 in the slide valve 46 with a passage 88 leading to an atmospheric exhaust port, so that the application chamber and the chamber at the outer face of the application piston 26 is open to the exhaust and therefore the application piston is maintained in release position, as shown in Fig. 2, in which the valve chamber 34, constantly open to the service brake cylinder through passage 35, is in communication with exhaust passage 37.

The graduating spring 89 may be constructed to act as a release spring, if desired, so as to facilitate the full movement of the parts to release position after an application of the brakes is made or after a graduated release has been effected or where there is a possibility that the differential of fluid pressures acting on the piston 26 may not be great enough to insure the desired full movement of the parts. In full release position, the reduction reservoir 90 is connected through passage 91, and cavity 92 in the slide valve 41 with an exhaust port 93.

The space between the piston heads 57 and 58 of the emergency valve mechanism 25 is in open communication with the emergency reservoir through passage 70 and as passage 94, leading from the outer chamber adjacent to the piston head 57, is closed at the slide valve 46, fluid equalizes through port 95 in said piston head from the chamber intermediate the piston heads. Passage 96, leading from the chamber at the outer face of piston head 58, is connected through cavity 97 in the valve 46 with an exhaust port 98, so that said piston head is at atmospheric pressure, and therefore the unbalanced fluid pressure acting on the piston head 57 maintains the emergency valve mechanism in the normal position, shown in Fig. 2, in which the emergency brake cylinder pipe 7 is connected through passage 99, and cavity 100 in the valve 59 with an exhaust passage 101. A cavity 102 in said valve 59 also connects passage 103 leading from the space between piston 26 and a piston 104, with a passage 105 opening into the service brake cylinder passage 35.

An application of the brakes may be made in the usual manner by reducing the train pipe pressure, which first causes the release piston 44 to move out from release position. This is by reason of the fact that the equalizing piston 38 is provided with means for preventing its initial movement directly by the reduction in train pipe pressure and for this purpose the equalizing valve device is provided with an auxiliary piston 106 at its inner end. In the normal full release position of the parts, a passage 107 leading from the chamber at the outer face of the piston 106 is connected to the atmosphere through passage 108, cavity 97 in slide valve 46, and exhaust port 98, said piston being adapted to seat tightly and prevent leakage of fluid from the valve chamber 43. As the piston 106 is subject to atmospheric pressure, a differential is created on the equalizing piston device which is sufficient to prevent its movement directly by a reduction in train pipe pressure. Upon the outward movement of the release piston 44, however, to the position shown in Fig. 5, the passages 107 and 108 are connected by port 109 in the slide valve 46 with valve chamber 48, so that fluid in valve chamber 48 and at the pressure of the pressure chamber is admitted to the piston 106. The fluid pressures on opposite sides of the piston 106 being thus balanced, the reduced train pipe pressure on the equalizing piston, starts the same from the release position.

The initial movement of the release piston 44 opens the passage 75 to the opposite side of the piston, so that so long as the equalizing valve device 22 remains in full release position, the two valve chambers 43 and 48 are connected together through the passage 75 and the port 77. This insures the maintenance of pressure in the valve chamber 43 in the full release position thereof. If the valve chamber 43 remained in communication with the train pipe through passage 75 it might happen that through leakage of fluid from the valve chamber past the check valve 76 the valve chamber pressure would be reduced and thus tend to make the equalizing valve device somewhat less sensitive to movement upon a reduction in train pipe pressure.

The initial movement of the equalizing piston 38 first shifts the auxiliary valve 42 to a position in which cavity 129 therein connects port 114 with a port opening of port 62, so that communication is opened from the pressure chamber 49 through the passages 50 and 63 to the valve chamber 43. This tends to maintain the pressure in the valve chamber 43 after the auxiliary valve 42 has moved to close communication through the port 77. This initial movement of the auxiliary valve 42 also operates to connect port 110 in said valve with a port opening of port 69 in the main valve 41, so that fluid from the emergency reservoir is vented to the valve chamber 43. This also is for the purpose of maintaining the pressure in the valve chamber 43 and furthermore serves to compensate for any reduction in pressure in the valve chamber 43 due to the increased volume of said chamber by reason of the displacement of the piston 38 in moving out to service application position. The port opening of port 62 which registers with passage 63 has a foot extension, so that communication from the pressure chamber to the valve chamber 43 is maintained during the initial movement of the main slide valve 41. The further outward movement of the equalizing piston 38 starts the main valve 41 and before the foot extension of the port 62 moves out of register with the passage 63, the outward movement of the piston 106 opens a port 116 around said piston, which permits flow of air from the valve chamber 48 through the ports 108 and 107 to the valve chamber 43, and thereby assures equalization of pressures between the valve chambers 48 and 43.

The equalizing piston 38 having moved out to service application position engaging the graduating spring stop 117, as shown in Fig. 3, direct communication is opened from the pressure chamber 49 to the valve chamber 43 through passages 50 and 63 and port 118 in the slide valve 41, so that valve chamber 43 is maintained at the pressure in the pressure chamber in said position and a port 19 in slide valve 41 may also register with passage 111 to further assist in maintaining the pressure in the valve chamber 43 by connection with valve chamber 48. It will now be evident that throughout the movement of the equalizing valve device from full release position to service application position, the pressure in the valve chamber is connected either directly or indirectly with the pressure chamber and therefore the pressures in both valve chambers 43 and 48 are maintained substantially at the pressure in said pressure chamber. This eliminates any lap position during the movement to service application position which might tend on movement of the equalizing piston to reduce the pressure in the valve chamber 43 and thus hinder the prompt movement of the equalizing valve device.

In service application position, as shown in Fig. 3, passage 28, leading from application chamber 29, registers with a port 15, so that fluid from valve chamber 43 and consequently the pressure chamber 49 flows to the application chamber. The application piston 26 is thereupon shifted by the increase in pressure in the application chamber to application position, as shown in Fig. 3, in which the release valve 36 closes the service brake cylinder exhaust port 37 and the valve 30 opens communication through port 33 from the valve chamber 31 to the valve chamber 34. Fluid is thus admitted to the service brake cylinder through passage 35 from the service reservoir 8. Upon reduction in pressure in the pressure chamber 49 by flow to the application chamber 29 to a degree equal to or slightly less than the reduced pressure in the train pipe, the equalizing piston 38 is operated to shift the auxiliary valve 42 and lap the service port 15, thus cutting off further flow of air to the application chamber and the release piston 44 also moves back to lap the port 109 as shown in Fig. 6. As soon as the pressure in the service brake cylinder has increased by flow of air from the service reservoir to a point equaling or slightly exceeding the application chamber pressure acting on the opposite side of piston 26, the same moves to lap position, closing the supply port 33 and preventing the further flow of air to the service brake cylinder. By making further gradual reductions in train pipe pressure, the equalizing piston may be operated to shift the auxiliary valve 42 and supply fluid to the application chamber, so as to cause the movement of the piston 26 to again open the supply port 33, the parts being again moved to lap position upon substantial equalization of pressures as in the case of the initial reduction in train pipe pressure above described.

If the pressure in the pressure chamber should be reduced by flow to the application chamber to the point of equalization with respect to the application chamber, any further reduction in train pipe pressure will operate to move the equalizing piston to its extreme outward seating position, in which position, which may be termed the over reduction position, port 15 registers with passage 91, leading to the reduction reservoir 90. It will be noted that this reduction reservoir is normally maintained at atmospheric pressure as described in connection with the release position and also in normal service application position, the cavity 92 in valve 41 maintaining the connection from the passage 91 to the exhaust port 93 throughout the movement of parts from release position to service application position. In the over reduction service position, however, as shown in Fig. 7, fluid from the valve chamber 43 and the pressure chamber is vented to the reduction reservoir 90 through the port 15, and upon a reduction in the pressure of the pressure chamber by flow to said reduction reservoir to a point slightly less than the reduced train pipe pressure, the piston 38 operates to shift the auxiliary valve 42 and thereby close the port 15, as shown in Fig. 8. Further reductions in train pipe pressure below the equalizing point, cause the movement of the piston 38 to again shift the auxiliary valve 42, and the pressure in the pressure chamber is further reduced by flow to the reduction reservoir until the pressures in the pressure chamber and the reduction reservoir equalize.

During reductions in train pipe pressure up to the point at which the pressure of the pressure chamber equalizes with the pressure in the reduction reservoir, the release piston is maintained in the normal service application position by means of the spring stop 119, the spring of which is adjusted to resist a somewhat higher pressure than the spring 117 acting on the piston 38, so that, as the pressure in the valve chamber 48 reduces with that in valve chamber 43 by way of port 109 and passages 108 and 111, the piston 44 is prevented from moving out beyond the normal service position, the piston 44 operating under such reductions in train pipe pressure to open and close the port 109. When, however, the equalization of pressures between the pressure chamber and the reduction reservoir takes place, then a further reduction in train pipe pressure causes the piston 44 to be shifted to its extreme outer position against the resistance of the spring stop 119.

The initial movement of the slide valve 46 from service application position out toward emergency application position operates to uncover passage 126 which leads to the emergency reservoir passage 70, so that fluid from the emergency reservoir is vented to the valve chamber 48. The sudden increase in pressure thus produced in the valve chamber 48 causes the prompt and positive movement of the release valve device 23 to emergency application position. A port 127 in the slide valve 46 also registers with passage 108, thus permitting flow of air from the valve chamber 48 to the valve chamber 43, so that the pressure in valve chamber 43 is maintained equal to that in valve chamber 48.

In the emergency position of the piston 44, as shown in Fig. 4, passage 94, leading from piston head 57 of the emergency valve mechanism 25 is connected by cavity 97 in the slide valve 46 with exhaust port 98 while port 96 leading from piston head 58 is blanked. Emergency reservoir pressure on the opposite side of piston head 57 thereupon shifts the valve mechanism 25 to the position shown in Fig. 4, in which the passage 99, leading to the emergency brake cylinder, is uncovered by the valve 59. Fluid from the emergency reservoir is thus admitted to the emergency brake cylinder to effect an emergency application of the brakes. Passage 103 is connected by cavity 100 with exhaust passage 101, so that the space between pistons 26 and 104 is vented to the atmosphere to insure the maintenance of the application valve device 21 in application position. Port 120 in the valve 59 also registers with passage 105, so that fluid from the emergency reservoir is likewise admitted to the service brake cylinder through passage 35.

In the emergency position of the release valve device 23, a passage 121 leading to one side of a valve piston 122 is uncovered by the slide valve 46, so that fluid under pressure is supplied thereto, while the opposite side of said valve piston is open through a passage 123 to the emergency brake cylinder passage 99. The higher pressure acting on the under side of the valve piston 122 operates to open the same and permit fluid to flow to the emergency piston 52, which is thereupon operated to open the emergency valve 54 and vent air from the train pipe through passage 55 to exhaust passage 56 to thereby effect a local reduction in train pipe pressure and consequent quick serial action of the control valve devices throughout the train. When the emergency brake cylinder pressure has increased to substantially equal that on the opposite side of the valve piston 122, or as a matter of fact, upon equalization of the pressures of all the reservoirs into the brake cylinders, since all the chambers, reservoirs, and brake cylinders are connected together in emergency application position, then the valve piston 122 is closed by the spring 124, and fluid under pressure quickly equalizing upon opposite sides of the emergency piston 52, through an equalizing port or around the piston, the valve 54 is closed by the spring 125 and further venting of fluid from the train pipe is stopped.

In order to release the brakes after an application thereof, the train pipe pressure is increased, and the pistons 38 and 44 are shifted to release position. The equalizing piston 38 starts first before the piston 44 moves because the slide valve 41 has no large exhaust cavities nor ports such as found in the slide valve 46, and in order to facilitate the movement of the release piston 44, it is provided that upon movement of the equalizing piston 38 nearly to full release position, as shown in Fig. 9, the passage 61 leading from the valve chamber 48 registers with port 128 in the slide valve 41, which in turn is connected by a cavity 129 in the auxiliary valve 42 with port and cavity 92, so that fluid is thereupon vented from the valve chamber 48 to the exhaust port 93 and the movement of the release valve device 23 to release position is thus facilitated. In the above position of the slide valve 41, port 62 has port openings adapted to register with passages 63 and 111, so that the pressure chamber is connected to the back of the piston 106. The admission of fluid to the back of this piston tends to retard the further inner movement of the piston 38 in addition to the retarding action of the spring 115 and consequently the slide valve 41 is held in the position for venting air from the valve chamber 48 until the release piston 44 has moved inwardly to full release position, in which position, as shown in Fig. 10, passage 108 is connected by cavity 97 in slide valve 46 with exhaust port 98. Air is thereupon vented from the back of the piston 106 to the atmosphere, and the full movement of the equalizing piston 38 to release position is promptly effected.

It will be noted that as the port 62 establishes communication from the pressure chamber to the back of the piston 106, there will be an inflow of fluid as well as an outflow at the exhaust port 98, so that it is necessary for the release piston 44 to move fully to release position and fully open the passage 108 in order to get a sufficient reduction in pressure on the piston 106 to effect the full movement of the equalizing valve device to release position. In the full release position of the release piston 44, passage 84, leading to application chamber passage 28 is connected through port 85, cavity 86 in the auxiliary valve 47, and port 87 with exhaust passage 88, so that fluid in the application chamber and on the application piston 26 is vented to the atmosphere and the application valve mechanism 21 is thereupon shifted to release position and the brake cylinder is vented to the atmosphere through exhaust port 37. It will now be clear that the pistons 38 and 44 mutually assist each other in the movement to release position, that is to say, the equalizing valve device moving first, operates as a pilot valve to facilitate or insure the movement of the release valve device, while the release valve device acts in release position as a pilot valve for the equalizing valve device to insure its full movement to release position.

If the graduated release is cut in, the cap 64 is applied to the control valve mechanism as shown in Fig. 2, with cavity 67 connecting the passages 66 and 68. In order to graduate the release of the brakes after an application, a gradual increase in train pipe pressure is made and both the pistons 38 and 44 are shifted to release position as hereinbefore described in connection with fully releasing the brakes, but when the release valve device moves to release position, the emergency or supplemental reservoir 9 is connected to the valve chamber 48 through passage 70, port 69 in valve 41, passage 68, cavity 67, passage 66 and port 65 in valve 46. Fluid at the high pressure of the emergency reservoir is thus vented to the valve chamber 48 and the piston 44 is thereupon operated to shift the auxiliary valve 47 and close the port 65. Fluid from the application chamber is thus partially vented while the auxiliary valve 47 remains in release position but upon movement of the auxiliary valve as described above, the cavity 86 is moved to cut off the communication for venting air from the application chamber.

The partial reduction in pressure in the application chamber causes the application piston to be shifted to release position by the higher brake cylinder pressure so that fluid is vented from the brake cylinder to correspond with the reduction in application chamber pressure. Upon substantial equalization of the application chamber and brake cylinder pressures, the piston 26 is operated to cut off the exhaust from the brake cylinder. Further gradual reductions in brake cylinder pressure may be made in a similar manner by further increasing the train pipe pressure, the equalizing valve device remaining in full release position, while the release piston 44 moves the auxiliary valve 47 between release and release lap positions.

If it is desired to cut out the graduated release, the cap 64 is applied in a position in which the cavity 67 connects a passage 130 with exhaust passage 88, and in the release position of the valve 46, the passage 130 registers with a port opening of port 85, so that in releasing the brakes fluid from the application chamber is vented to the atmosphere directly through a port in the main slide valve 46 instead of through the auxiliary valve 47. The cap 64 may be provided with a mark or indicator, so that by inspection it can be determined whether the cap is in the graduated release position or the ordinary release position.

An emergency application of the brakes may be effected by making a sudden reduction in train pipe pressure, whereupon the pistons 38 and 44 are both shifted to their extreme outer positions as shown in Fig. 4 and as hereinbefore described, the passage 94 is connected by port 97 with exhaust port 98 and passage 96 is blanked by the slide valve 46, so that the emergency valve mechanism 25 is shifted to its emergency position, in which the emergency brake cylinder 5 is connected through passage 99 directly with the valve chamber intermediate the piston heads 57 and 58 and consequently fluid from the emergency reservoir is admitted to the emergency brake cylinder. Fluid is also supplied through passage 121 to the under side of the valve piston 122 operating the same so as to admit fluid under pressure to the emergency piston 52. The emergency piston then operates the valve 54 to open communication for venting air from the train pipe to effect a local reduction in train pipe pressure and consequent quick serial action of all the control valve devices throughout the train. Passage 84 is also uncovered by the slide valve 46, so that fluid under pressure is admitted to the application chamber and piston 26, thereby shifting the application and release valve mechanism 21 to application position so that fluid from the service reservoir is admitted to the service brake cylinder 4. It will be noted that an emergency application is effected through the operation of the release equalizing valve device 23 and that the equalizing valve device 22 does not serve any purpose at this time.

While the present invention has been described in connection with an application valve device having an application chamber, variations in pressure in which control the operation of a valve mechanism for supplying air to the brake cylinder, it is to be understood that the separate equalizing and release valve devices may be employed in connection with controlling the supply and release of air to and from a brake cylinder directly, without employing the application valve device. It will also be understood that while the equipment is provided with two brake cylinders, a service brake cylinder, and an emergency brake cylinder, the invention may be employed with the usual single brake cylinder. In other words, the passage 28 may be connected directly to a brake cylinder instead of to the application chamber shown.

By providing a separate equalizing valve device and a separate release valve device, the release valve device can be employed to effect emergency applications of the brakes and consequently the service port of the equalizing valve device can be made large enough to insure a sufficient drop in pressure on the pressure chamber side when the equalizing valve device moves to service application position, so that the same will stop in that position and not have a tendency to move out beyond said position to the second service position.

Heretofore, the size of the service port was limited, in order to insure the movement of the parts to emergency position when a certain predetermined differential of pressures was created on the equalizing piston. It will be noted in connection with graduated release, that connection from the emergency reservoir to the release valve chamber is controlled by the equalizing valve device (through port 69, passage 68, cavity 67, and passage 66,) so that it is necessary for the equalizing valve device to be in its full release position, or no fluid can be supplied from the emergency reservoir to the release valve chamber to effect a graduated release, and consequently full movement of the release valve device to release position is assured because the pressure in the release valve chamber is not increased by flow from the emergency reservoir unless the equalizing valve device is back in full release position and said valve device cannot move to the full release position until the release valve device has moved to its full release position.

Another feature which should be noted is that of maintaining the pressure in the application chamber in second service position. This is secured by means of the recharging valve device, the piston head 78 of which is connected in the second service position through passage 81, port 62, and passage 28 with the application chamber, while the piston head 79 is connected through passage 80, port 69, and port 110 with valve chamber 43 and consequently the pressure chamber. Thus any slight leakage from the application chamber is supplied by leakage from the service reservoir around the piston head 78, the service reservoir being connected to the space intermediate the piston heads 78 and 79 by passage 82. If the leakage from the application chamber should be sufficient to cause the movement of the recharging valve device by the pressure in the pressure chamber on the piston head 79, then the passage 82 is opened directly to the passage 81 and the pressure in the application chamber is quickly built up. The recharging valve device then returns to its normal position as soon as the pressure in the application chamber has been increased to within a few pounds of the pressure in the pressure chamber, according to the relative sizes of the piston heads 78 and 79.

Having now described my invention, what I claim as new and desire to secure by Letters Patent, is:—

1. In a fluid pressure brake, the combination with a valve device subject to train pipe pressure for effecting a service application of the brakes, of means operating upon a gradual reduction in train pipe pressure for effecting the movement of said valve device.

2. In a fluid pressure brake, the combination with an equalizing valve device subject to the opposing pressures of the train pipe and a chamber and adapted to effect an application of the brakes, of a second valve device subject to the opposing pressures of the train pipe and a chamber and operating upon a reduction in train pipe pressure for effecting the movement of said equalizing valve device.

3. In a fluid pressure brake, the combination with an equalizing valve device comprising valve means for effecting an application of the brakes and a movable abutment subject to the opposing pressures of a train pipe and a chamber for operating said valve means, of a second valve device comprising valve means for controlling the operation of said equalizing valve device and a movable abutment subject to the opposing pressures of the train pipe and a chamber for actuating said valve means upon a reduction in train pipe pressure.

4. In a fluid pressure brake, the combination with an equalizing valve device subject to the opposing pressures of the train pipe and a chamber for effecting an application of the brakes and a piston carried by said valve device, of a second valve device operating upon a reduction in train pipe pressure for supplying fluid to said piston to effect the movement of said equalizing valve device.

5. In a fluid pressure brake, the combination with an equalizing valve device subject to the opposing pressures of the train pipe and a chamber for effecting an application of the brakes and a piston carried by said valve device, of a second valve device having a position for connecting said piston to the atmosphere and operating upon a reduction in train pipe pressure to supply fluid to said piston to initiate the movement of said equalizing valve device.

6. In a fluid pressure brake, the combination with an equalizing valve device operated by a reduction in train pipe pressure for effecting an application of the brakes, of a valve device subject to train pipe pressure for effecting the release of the brakes, said release valve device being operated upon a reduction in train pipe pressure to effect the initial movement of the equalizing valve device.

7. In a fluid pressure brake, the combination with an equalizing valve device subject to train pipe pressure for effecting an application of the brakes, of a valve device subject to train pipe pressure for effecting the release of the brakes, said release valve device comprising a movable abutment, a main valve and an auxiliary valve having a movement relative to the main valve and operated by said abutment upon a gradual reduction in train pipe pressure for supplying fluid to said equalizing valve device to initially move same.

8. In a fluid pressure brake, the combination with a valve device subject to variations in train pipe pressure for effecting an application of the brakes, of a valve device subject to train pipe pressure for effecting the release of the brakes, the movement of each valve device being dependent upon the movement of the other valve device.

9. In a fluid pressure brake, the combination with an equalizing valve device having a piston subject to train pipe pressure and valve means operated by said piston for controlling the supply of fluid to effect an application of the brakes, of a movable abutment carried by said valve device and normally subject to atmospheric pressure and a valve device operated upon a reduction in train pipe pressure to supply fluid to said abutment to initiate the movement of the equalizing valve device.

10. In a fluid pressure brake, the combination with an equalizing valve device comprising a piston subject to train pipe pressure, a movable abutment normally subject on one side to atmospheric pressure, and valve means operated by said piston for supplying fluid to effect an application of the brakes, of a valve device operated upon a reduction in train pipe pressure for supplying fluid to said movable abutment to initiate the movement of said equalizing valve device.

11. In a fluid pressure brake, the combination with a train pipe, of an equalizing valve device subject to train pipe pressure for supplying fluid to effect an application of the brakes, a release valve device subject to train pipe pressure for releasing fluid to effect the release of the brakes, and means operated by said equalizing valve device upon an increase in train pipe pressure for effecting the movement of the release valve device to release position.

12. In a fluid pressure brake, the combination with a train pipe, of an equalizing valve device subject to train pipe pressure for supplying fluid to effect an application of the brakes, a release valve device subject to train pipe pressure for releasing fluid to effect the release of the brakes, said release valve device being moved to brake application position upon a reduction in train pipe pressure, and means operated by said equalizing valve device upon an increase in train pipe pressure for initiating the movement of the release valve device from the application position toward release position.

13. In a fluid pressure brake, the combination with a train pipe, of an equalizing valve device subject to train pipe pressure for supplying fluid to effect an application of the brakes, a release valve device subject to train pipe pressure for releasing fluid to effect the release of the brakes, said equalizing valve device being shifted from the application position upon an increase in train pipe pressure to a position in which fluid is vented from one side of the release valve device to thereby effect the movement thereof to release position.

14. In a fluid pressure brake, the combination with a train pipe, of an equalizing valve device subject to train pipe pressure for supplying fluid to effect an application of the brakes, a release valve device subject to train pipe pressure for releasing fluid to effect the release of the brakes, said release valve device being moved upon a reduction in train pipe pressure to the position for applying the brakes, and means operated in the movement of the equalizing valve device from application position upon an increase in train pipe pressure for venting fluid from the release valve device to initiate the movement of said release valve device from the application position.

15. In a fluid pressure brake, the combination with a train pipe, of an equalizing valve device comprising a piston subject to the opposing pressures of the train pipe and a chamber and valve means operated by said piston upon a reduction in train pipe pressure for supplying fluid to effect an application of the brakes, a release valve device comprising a piston subject to the opposing pressures of the train pipe and a chamber and operated upon an increase in train pipe pressure for releasing fluid to effect the release of the brakes, and means operated by said equalizing valve device upon an increase in train pipe pressure for venting fluid from the chamber side of the release piston to thereby initiate the movement of the release valve device to release position.

16. In a fluid pressure brake, the combination with a train pipe, of an equalizing valve device subject to train pipe pressure and operated upon a reduction in train pipe pressure for supplying fluid to effect an application of the brakes, a release valve device subject to train pipe pressure and operated upon an increase in train pipe pressure for releasing fluid to effect the release of the brakes, means controlled by said equalizing valve device and adapted upon movement of the equalizing valve device by an increase in train pipe pressure to effect the initial movement of the release valve device, and means controlled by said release valve device and adapted upon movement of the release valve device to full release position to effect the full movement of the equalizing valve device to release position.

17. In a fluid pressure brake, the combination with an equalizing valve device for effecting an application of the brakes and a release valve device for effecting the release of the brakes, of means operated by the equalizing valve device upon movement in the direction to release the brakes for initiating the movement of the release valve device toward release position and means operated by said release valve device upon movement to release position for effecting the full movement of the equalizing valve device to release position.

18. In a fluid pressure brake, the combination with a train pipe, an equalizing valve device subject to train pipe pressure and having a release position and a brake application position, and a release valve device subject to train pipe pressure and having a release position and a brake application position, of means adapted upon movement of the equalizing valve device in releasing the brakes to a position intermediate application and release positions to effect the movement of the release valve device to release position, and means operated by said release valve device in release position for effecting the movement of the equalizing valve device from said intermediate position to release position.

19. In a fluid pressure brake, the combination with a train pipe, an equalizing valve device subject to train pipe pressure and having a release position and a brake application position, and a release valve device subject to train pipe pressure and having a release position and a brake application position, of means adapted upon movement of the equalizing valve device in releasing the brakes to a position intermediate application and release positions to effect the movement of the release valve device to release position, means tending to hold the equalizing valve device in said intermediate position, and means operated by the release valve device upon movement to release position for effecting the movement of the equalizing valve device from the intermediate position to release position.

20. In a fluid pressure brake, the combination with a train pipe, an equalizing valve device operating upon a reduction in train pipe pressure for applying the brakes, a release valve device operating upon an increase in train pipe pressure for releasing the brakes, of means controlled by the release valve device upon movement under a reduction in train pipe pressure for initiating the movement of the equalizing valve device to application position and means controlled by the equalizing valve device upon movement toward release position under an increase in train pipe pressure for initiating the movement of the release valve device to release position.

21. In a fluid pressure brake, the combination with a train pipe, an equalizing valve device operating upon a reduction in train pipe pressure for applying the brakes, a release valve device operating upon an increase in train pipe pressure for releasing the brakes, of means controlled by the release valve device upon movement under a reduction in train pipe pressure for initiating the movement of the equalizing valve device to application position, means controlled by the equalizing valve device upon movement in the direction for releasing the brakes under an increase in train pipe pressure for initiating the movement of the release valve device to release position, and means controlled by the release valve device upon movement to release position for effecting the full movement of the equalizing valve device to release position.

22. In a fluid pressure brake, the combination with a brake pipe and an equalizing valve device subject to the opposing pressures of the brake pipe and a chamber, of a reservoir from which fluid is supplied to effect an application of the brakes, a second reservoir adapted to be charged from the brake pipe, and means for recharging the first reservoir from the second with said chamber cut off from the first reservoir.

23. In a fluid pressure brake, the combination with a train pipe, of a valve chamber, a pressure chamber, a valve device subject to the opposing pressures of the valve chamber and the train pipe for supplying fluid from said pressure chamber to effect an application of the brakes, said valve chamber being closed to the pressure chamber in full release position of the valve device, and means for maintaining communication from the pressure chamber to said valve chamber in the movement from release position to effect an application of the brakes.

24. In a fluid pressure brake, the combination with a train pipe, of a valve chamber, a pressure chamber, a valve device subject to the opposing pressures of the valve chamber and the train pipe for supplying fluid from said pressure chamber to effect an application of the brakes and for controlling communication from the pressure chamber to the valve chamber, said valve chamber being charged from the train pipe in full release position and being connected to the pressure chamber throughout the movement of said valve device from full release position to brake application position.

25. In a fluid pressure brake, the combination with a train pipe, of a valve device subject to the opposing pressures of the train pipe and a pressure chamber for effecting an application of the brakes, a reservoir for supplying fluid to apply the brakes, and means for recharging said reservoir when the pressure in the pressure chamber exceeds the pressure in the reservoir by a predetermined amount.

26. In a fluid pressure brake, the combination with a train pipe, of a pressure chamber, a valve device subject to the opposing pressures of the pressure chamber and the train pipe for effecting an application of the brakes, a reservoir from which air is supplied to apply the brakes, and means for recharging the reservoir from the train pipe in releasing the brakes when the pressure in the pressure chamber exceeds the pressure in the reservoir by a predetermined amount.

27. In a fluid pressure brake, the combination with a train pipe, of an application chamber, a reservoir, an application valve device operated by the pressure in said application chamber for supplying fluid from said reservoir to effect an application of the brakes, a pressure chamber, an equalizing valve device subject to the opposing pressures of the pressure chamber and the train pipe for supplying fluid to the application chamber, and means governed by the pressure in the pressure chamber for controlling communication for recharging the reservoir.

28. In a fluid pressure brake, the combination with a train pipe, of a reservoir for supplying fluid to effect a service application of the brakes, a reservoir for supplying fluid to effect an emergency application of the brakes, a pressure chamber, a valve device subject to the opposing pressures of the pressure chamber and the train pipe for effecting an application of the brakes, and means for recharging the service reservoir from the emergency reservoir when the pressure in the pressure chamber exceeds the pressure in the emergency reservoir by a predetermined amount.

29. In a fluid pressure brake, the combination with a train pipe, of a reservoir for supplying fluid to effect a service application of the brakes, a reservoir for supplying fluid to effect an emergency application of the brakes, a pressure chamber, a valve device subject to the opposing pressures of the pressure chamber and the train pipe for effecting an application of the brakes, and a valve device subject to the opposing pressures of the pressure chamber and the emergency reservoir for controlling the recharge of the service reservoir.

30. In a fluid pressure brake, the combination with a train pipe, of a reservoir for supplying fluid to effect a service application of the brakes, a reservoir for supplying fluid to effect an emergency application of the brakes, a pressure chamber, a valve device subject to the opposing pressures of the pressure chamber and the train pipe for effecting an application of the brakes, and a differential piston subject to the opposing pressures of the pressure chamber and the emergency reservoir for controlling communication for recharging the service reservoir.

31. In a fluid pressure brake, the combination with a train pipe, of a reservoir for supplying fluid to effect a service application of the brakes, a reservoir for supplying fluid to effect an emergency application of the brakes, a pressure chamber, a valve device subject to the opposing pressures of the pressure chamber and the train pipe for effecting an application of the brakes, and a valve device operated by the pressure in the pressure chamber for controlling the recharge of the service reservoir.

32. In a fluid pressure brake, the combination with a train pipe, of a reservoir for supplying fluid to effect a service application of the brakes, a reservoir for supplying fluid to effect an emergency application of the brakes, a pressure chamber, a valve device subject to the opposing pressures of the pressure chamber and the train pipe for effecting an application of the brakes, and a valve device operated at a degree of pressure in the pressure chamber in excess of the pressure in the emergency reservoir for opening communication from the emergency reservoir to the service reservoir to thereby recharge the service reservoir.

33. In a fluid pressure brake, the combination with a train pipe, of a pressure chamber, an equalizing valve device subject to the opposing pressures of the train pipe and a valve chamber for supplying air from the pressure chamber to effect an application of the brakes, a release valve device subject to the opposing pressures of the train pipe and a valve chamber, and means for cutting off communication from the pressure chamber to one valve chamber when the other valve chamber is open to the pressure chamber.

34. In a fluid pressure brake, the combination with a train pipe, of a pressure chamber, an equalizing valve device subject to the opposing pressures of the train pipe and a valve chamber for supplying air from the pressure chamber to effect an application of the brakes, a release valve device subject to the opposing pressures of the train pipe and a valve chamber, both valve chambers being open at times to the pressure chamber, and means for cutting off communication from the pressure chamber to one valve chamber when the other valve chamber is open to the pressure chamber to prevent possible leakage from the train pipe to the pressure chamber from both valve devices at the same time.

35. In a fluid pressure brake, the combination with a train pipe, of a valve device subject to the opposing pressures of the train pipe and a chamber for effecting an application of the brakes and means operating upon movement of said valve device to apply the brakes for venting fluid to said chamber to compensate for the displacement due to the movement of said valve device.

36. In a fluid pressure brake, the combination with a train pipe, of a valve device subject to the opposing pressures of the train pipe and a chamber and operating upon a reduction in train pipe pressure for effecting an application of the brakes, a reservoir containing fluid under pressure, and means adapted upon initial movement of said valve device to effect an application of the brakes for venting fluid from said reservoir to said valve chamber.

37. In a fluid pressure brake, the combination with a train pipe, of a valve device subject to the opposing pressures of the train pipe and a chamber for effecting an application of the brakes, an emergency reservoir containing fluid under pressure for supplying fluid to effect an emergency application of the brakes, and means operating upon initial movement of said valve device to apply the brakes for venting fluid from the emergency reservoir to said chamber.

38. In a fluid pressure brake, the combination with a valve device for effecting a service application of the brakes, of a valve device for controlling the release of the brakes and means controlled by said release valve device for effecting an emergency application of the brakes.

39. In a fluid pressure brake, the combination with a valve device operating upon a gradual reduction in train pipe pressure for effecting an application of the brakes, of a valve device operating upon an increase in train pipe pressure for effecting the release of the brakes and means controlled by said release valve device for effecting an emergency application of the brakes.

40. In a fluid pressure brake, the combination with a train pipe, of a valve device operating upon a gradual reduction in train pipe pressure for effecting a service application of the brakes, a valve device operating upon an increase in train pipe pressure for effecting the release of the brakes, and means operated by said release valve device upon a sudden reduction in train pipe pressure for effecting an emergency application of the brakes.

41. In a fluid pressure brake, the combination with a train pipe, of a pressure chamber containing fluid under pressure, a reduction reservoir normally subject to atmospheric pressure, a valve device having an inner extreme position and an outer extreme position in which fluid is vented from said pressure chamber to said reduction reservoir, said valve device being adapted in a position intermediate its opposite extreme positions to supply fluid from said pressure chamber to effect an application of the brakes.

42. In a fluid pressure brake, the combination with a train pipe, of an application chamber, a valve mechanism subject to variations in pressure in said chamber for controlling the application and release of the brakes, and two separate valve devices subject to train pipe pressure for controlling the fluid pressure in said application chamber.

43. In a fluid pressure brake, the combination with a train pipe and brake cylinder, of an application chamber, a valve mechanism operated by variations in pressure in said chamber for supplying and releasing fluid to and from said brake cylinder, a valve device operating upon a reduction in train pipe pressure for supplying fluid to said chamber, and a valve device operating upon an increase in train pipe pressure for releasing fluid from said chamber.

44. In a fluid pressure brake, the combination with a train pipe and brake cylinder, of an application chamber, a valve mechanism operated by variations in pressure in said chamber for supplying and releasing fluid to and from said brake cylinder, an equalizing valve device adapted to supply fluid to said application chamber, and a valve device operating upon a reduction in train pipe pressure for initiating the movement of said equalizing valve device.

45. In a fluid pressure brake, the combination with a train pipe and brake cylinder, of an application chamber, a valve mechanism operated by variations in pressure in said chamber for supplying and releasing fluid to and from said brake cylinder, an equalizing valve device adapted to supply fluid to said application chamber, and a valve device operating upon a reduction in train pipe pressure for initiating the movement of said equalizing valve device, said equalizing valve device being adapted upon an increase in train pipe pressure to initiate the movement of the other valve device to release position.

46. In a fluid pressure brake, the combination with a train pipe and brake cylinder, of an application chamber, a valve mechanism operated by variations in pressure in said chamber for supplying and releasing fluid to and from said brake cylinder, an equalizing valve device subject to train pipe pressure for supplying fluid to said application chamber, a release valve device subject to train pipe pressure for releasing fluid from said chamber, means controlled by said release valve device for initiating the movement of the equalizing valve device upon a reduction in train pipe pressure, and means controlled by said equalizing valve device for initiating the movement of the release valve device to release position upon an increase in train pipe pressure.

47. In a fluid pressure brake, the combination with a train pipe, of a pressure chamber, an equalizing valve device operated by a reduction in train pipe pressure to supply fluid from said pressure chamber to effect an application of the brakes and controlling a train pipe recharging port, and a release valve device having a restricted feed groove constituting the only means for charging the pressure chamber from the train pipe through said train pipe recharging port, to thereby limit the flow of air from the train pipe in recharging, thus facilitating the release of the brakes.

48. In a fluid pressure brake, the combination with a train pipe, of an equalizing valve device subject to the opposing pressures of the train pipe and a chamber for supplying fluid from said chamber to effect a service application of the brakes and a valve device operating upon a sudden reduction in train pipe pressure to effect an emergency application of the brakes, said equalizing valve device being provided with a large service port through which fluid is supplied from said chamber in a service application, to thereby effect a rapid drop in pressure in said chamber and thus prevent movement of the equalizing valve device beyond service application position.

49. In a fluid pressure brake, the combination with a train pipe, of a valve device operating upon a predetermined reduction in train pipe pressure for effecting an emergency application of the brakes and an equalizing valve device subject to the opposing pressures of the train pipe and a chamber and having a large port for supplying fluid from said chamber to effect a service application of the brakes upon a gradual reduction in train pipe pressure, to thereby prevent movement of the equalizing valve device beyond service application position.

50. In a fluid pressure brake, the combination with a train pipe, of a source of fluid pressure, a valve device subject to the opposing pressures of the train pipe and a chamber for effecting the release of the brakes, means for supplying fluid from said source of fluid pressure to said chamber to effect a graduated release of the brakes, and a valve device subject to train pipe pressure for controlling the communication through which fluid is supplied from said source to said chamber.

51. In a fluid pressure brake, the combination with a train pipe, of a source of fluid pressure, a valve device subject to the opposing pressures of the train pipe and a chamber for effecting the release of the brakes, ports for supplying fluid from said source of fluid pressure to said chamber to effect a graduated release of the brakes, and an equalizing valve device operated upon a reduction in train pipe pressure for effecting an application of the brakes and adapted to control communication for supplying fluid from said source to said chamber.

52. In a fluid pressure brake, the combination with a train pipe, of a source of fluid pressure, a valve device subject to the opposing pressures of the train pipe and a chamber for effecting the release of the brakes, ports for supplying fluid from said source of fluid pressure to said chamber to effect a graduated release of the brakes, and an equalizing valve device operated upon a reduction in train pipe pressure for effecting an application of the brakes and adapted in release position only to open communication from the source of fluid pressure to said release valve device.

53. In a fluid pressure brake, the combination with a train pipe, of a source of fluid pressure, a valve device subject to the opposing pressures of the train pipe and a chamber for effecting the release of the brakes, ports for supplying fluid from said source of fluid pressure to said chamber to effect a graduated release of the brakes, and an equalizing valve device operated upon a reduction in train pipe pressure for effecting an application of the brakes and having ports adapted in release position to open communication for supplying fluid from said source to said release valve device.

54. In a fluid pressure brake, the combination with a train pipe, of an application chamber, a valve mechanism operated by the pressure in said chamber for effecting an application of the brakes, a valve device subject to the opposing pressures of the train pipe and a chamber for supplying fluid from said chamber to the application chamber upon a gradual reduction in train pipe pressure, means for venting fluid from said chamber upon an over reduction in train pipe pressure, and means for maintaining the pressure in the application chamber upon an over reduction in train pipe pressure.

55. In a fluid pressure brake, the combination with a train pipe, of an application chamber, a valve mechanism operated by the pressure in said chamber for effecting an application of the brakes, a valve device subject to the opposing pressures of the train pipe and a chamber for supplying fluid from said chamber to the application chamber upon a gradual reduction in train pipe pressure, means for venting fluid from said chamber upon an over reduction in train pipe pressure, a source of fluid pressure, and a valve device subject to the opposing pressures of said chamber and said application chamber for supplying fluid from said source to the application chamber to compensate for leakage during an over reduction in train pipe pressure.

56. In a fluid pressure brake, the combination with a train pipe and a service brake cylinder, of an application chamber, a valve mechanism operated by variations in pressure in said chamber for supplying and releasing fluid to and from said service brake cylinder, a valve device operating upon a gradual reduction in train pipe pressure for supplying fluid to said application chamber to operate said valve mechanism to supply fluid to the service brake cylinder, an emergency brake cylinder, and a release valve device operating upon an increase in train pipe pressure for releasing fluid from the application chamber and adapted upon a sudden reduction in train pipe pressure to effect the supply of fluid to said emergency brake cylinder.

57. In a fluid pressure brake, the combination with a train pipe and an equalizing valve device operated by variations in train pipe pressure for controlling the brakes, of means for increasing the normal resistance to movement of said equalizing valve device in release position.

58. In a fluid pressure brake, the combination with a train pipe and an equalizing valve device operated by variations in train pipe pressure for controlling the brakes, of means for increasing the usual resistance of the equalizing valve device to movement from release position in applying the brakes, said added resistance being cut off in the movement of the equalizing valve device to release position.

59. In a fluid pressure brake, the combination with a train pipe, of a valve device comprising a piston subject to the opposing pressures of the train pipe and a chamber, a main valve and an auxiliary valve operated thereby, and a reduction limiting reservoir, said auxiliary valve being operated by said piston upon a reduction in train pipe pressure below the equalizing point for venting fluid from said chamber to the reduction limiting reservoir.

In testimony whereof I have hereunto set my hand.

WALTER V. TURNER.

Witnesses:
A. M. CLEMENT,
R. C. SWARTZUCLEEN.